(12) United States Patent
Gautam et al.

(10) Patent No.: US 11,816,935 B2
(45) Date of Patent: Nov. 14, 2023

(54) PREDICTING A REPAIR AND MAINTENANCE ACTIVITY FOR AN AIRCRAFT SYSTEM

(71) Applicant: The Boeing Company, Chicago, IL (US)

(72) Inventors: Srishti Gautam, Bengaluru (IN); Seema Chopra, Bengaluru (IN); Franz Betz, Renton, WA (US); Akshata Kishore Moharir, Bengaluru (IN)

(73) Assignee: The Boeing Company, Chicago, IL (US)

( * ) Notice: Subject to any disclaimer, the term of this patent is extended or adjusted under 35 U.S.C. 154(b) by 447 days.

(21) Appl. No.: 17/036,408

(22) Filed: Sep. 29, 2020

(65) Prior Publication Data

US 2021/0118242 A1   Apr. 22, 2021

(30) Foreign Application Priority Data

Oct. 18, 2019   (IN) .............................. 201911042448

(51) Int. Cl.
| | |
|---|---|
| *G07C 5/00* | (2006.01) |
| *B64F 5/60* | (2017.01) |
| *B64F 5/40* | (2017.01) |
| *B64D 13/06* | (2006.01) |
| *G06N 20/00* | (2019.01) |
| *G07C 5/08* | (2006.01) |
| *B64D 45/00* | (2006.01) |

(52) U.S. Cl.
CPC ............. *G07C 5/006* (2013.01); *B64D 13/06* (2013.01); *B64F 5/40* (2017.01); *B64F 5/60* (2017.01); *G06N 20/00* (2019.01); *G07C 5/0841* (2013.01); *B64D 2045/0085* (2013.01)

(58) Field of Classification Search
CPC .... G07C 5/006; G07C 5/0841; G07C 5/0808; B64D 13/06; B64D 2045/0085; B64F 5/40; B64F 5/60; G06N 20/00
See application file for complete search history.

(56) References Cited

U.S. PATENT DOCUMENTS

| | | | |
|---|---|---|---|
| 11,598,880 B2 * | 3/2023 | Lu ........................ | G05B 23/024 |
| 2017/0061295 A1 * | 3/2017 | Horabin ............. | G05B 23/0235 |
| 2017/0352204 A1 * | 12/2017 | Huet ...................... | B64D 45/00 |

* cited by examiner

*Primary Examiner* — Brian P Sweeney
(74) *Attorney, Agent, or Firm* — Quinn IP Law

(57) ABSTRACT

Predicting a future needed repair and/or maintenance activity for an aircraft system such as a cabin air compressor detects a fault signal from the aircraft system, the fault signal being indicative of a fault in the aircraft system. The fault signal is logged into a machine learning computer system. A root cause of a fault signal is determined and the root cause of the fault signal is logged into the computer system. A repair of the root cause of the fault signal is determined and the repair of the root cause of the fault signal is logged into the computer system. The root cause of the fault signal and the repair of the root cause of the fault signal are merged, creating a classification of a future fault signal, a future root cause of the future fault signal and future repair of the future root cause.

20 Claims, 3 Drawing Sheets

PREDICTING A REPAIR AND MAINTENANCE ACTIVITY FOR AN AIRCRAFT SYSTEM

FIELD

This disclosure pertains to a method of predicting a needed repair and/or maintenance activity for an aircraft system. More specifically, this disclosure pertains to a method of predicting a needed repair and/or maintenance activity for an aircraft system, for example a cabin air compressor, from information gathered on the operation of the cabin air compressor just prior to and just after a fault is detected in the operation of the cabin air compressor. The information is logged into a computer system. A root cause of the fault is determined and is logged into the computer system. A repair of the root cause of the fault that is determined and logged into the computer system. The information logged into the computer system is used by the computer system to create a classification of future fault signals, future root causes of the future fault signals and future repairs of the future root causes of the future fault signals.

BACKGROUND

In an environmental control system of an aircraft, there are certain aircraft systems that are high priority areas due to their recording a high number of maintenance messages for the aircraft system. An example of such an aircraft system is the cabin air compressor.

The cabin air compressor is responsible for supplying pressurized air to the air conditioning pack and the trim air system in the aircraft. The air conditioning pack and the trim air system maintain a desirable cabin air temperature in the aircraft. If there is a fault in the cabin air compressor, a fault message is sent to and displayed by the environmental control system of the aircraft. This alerts the flight crew that the cabin air compressor is in need of repair or replacement.

When a fault message is sent to the environmental control system of the aircraft, it often leads to unplanned repair and/or maintenance of the cabin air compressor by a maintenance technician. Because the proper operation of the cabin air compressor is essential for passenger comfort in the aircraft cabin, it is necessary that the repair and/or maintenance of the cabin air compressor take place immediately after the end of the flight during which the fault message is sent to the environmental control system. This needed repair and/or maintenance of the cabin air compressor can cause delays to the next flight, or the follow on flight of the aircraft. There is a need for a solution to avoid such delays.

SUMMARY

The method of predicting a needed repair and/or maintenance activity for an aircraft system of this disclosure employs a plurality of sensors that continuously detect or sense operation signals or operation parameters of the aircraft system, such as a cabin air compressor. The plurality of sensors log the operation signals of the cabin air compressor sensed by the sensors to a computer system on the aircraft, such as a machine learning computer system.

When a fault in the operation of the cabin air compressor is sensed by any one of the plurality of sensors, a fault signal is sent to the environmental control system of the aircraft and to the computer system. The fault signal indicative of the fault detected in the cabin air compressor is logged in the computer system. Operation signals representative of operating conditions of the cabin air compressor sensed by the plurality of sensors for a period of time before the generation of the fault signal and for a period of time after the generation of the fault signal are also logged into the computer system. In the computer system, the operation signals of the cabin air compressor sensed by the plurality of sensors at the time of the fault signal are associated with the particular fault signal logged in the computer system.

A determination is then made by the machine learning computer system of what was the root cause of the fault signal generated by the cabin air compressor. The root cause of the fault signal is then logged into the computer system and is associated with the particular fault signal and the operation signals of the cabin air compressor sensed by the plurality of sensors at the time of the fault signal.

A determination is then made by the machine learning computer system of the needed repair and/or maintenance needed to the cabin air compressor to correct the root cause of the fault in the cabin air compressor that generated the fault signal. When the needed repair and/or maintenance of the cabin air compressor is done by a maintenance technician, the needed repair and/or maintenance activity is also logged into the computer system. The needed repair and/or maintenance activity of the cabin air compressor is associated in the computer system with the particular fault signal generated by the cabin air compressor and logged into the computer system, the root cause of the fault signal logged into the computer system, and the plurality of operation signals or parameters of the cabin air compressor sensed by the plurality of sensors at the time of the fault signal, for a period of time before the fault signal and a period of time after the fault signal that have been logged into the computer system.

In the computer system, the operation signals or operating parameters of the cabin air compressor sensed by the plurality of sensors at the time of the fault signal, for the period of time before the fault signal and the period of time after the fault signal that have been logged into the computer system, the fault signal generated by the cabin air compressor that has been logged into the computer system, the root cause of the fault signal that has been logged into the computer system, the repair of the root cause that has been logged into the computer system are associated together and merged together in creating a classification system of future fault signals, future root causes of the future fault signals and the future repairs needed and/or maintenance needed for the future root cause.

In subsequent flights, the operation signals or operating parameters of the cabin air compressor sensed by the plurality of sensors at the time of a fault signal during a subsequent flight are logged into the computer system, the fault signal generated by the cabin air compressor during the subsequent flight is logged into the computer system, the root cause of the fault signal during the subsequent flight is logged into the computer system, the repair of the root cause of the fault signal is logged into the computer system. This collection of data into the computer system is continued on subsequent flights. In the computer system, the data logged into the computer system from subsequent flights is continuously merged and creates a classification system that enables predicting a future needed repair and/or maintenance activity for the cabin air compressor from the plurality of sensors that continuously sense and monitor the operation signals or parameters of the cabin air compressor.

The operation signals or operating parameters of the cabin air compressor sensed by the plurality of sensors during a current flight are compared to previously logged operation signals or operating parameters of the cabin air compressor sensed by the plurality of sensors to predict a future fault signal, the root cause of the future fault signal and the repair of the root cause. In this way, future needed repairs and/or maintenance activity for the cabin air compressor are predicted.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

Further features of the method of predicting a needed repair and/or maintenance activity for an aircraft system of this disclosure are set forth in the following detailed description of the method and in the drawing figures.

DETAILED DESCRIPTION

Figure 1:
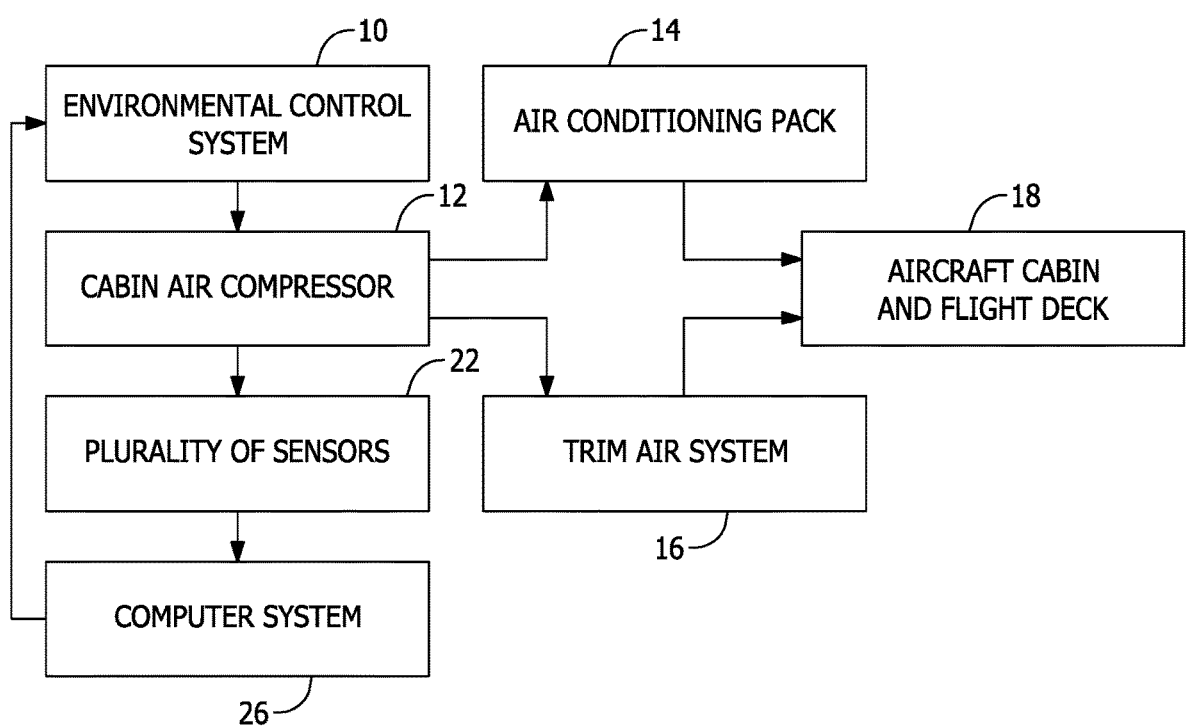
FIG. 1 is a schematic representation of the components associated with the aircraft system of this disclosure.

FIG. 1 is a schematic representation of the components associated with the aircraft system, or the cabin air compressor of this disclosure. Although the method of predicting a future needed repair and/or maintenance activity for an aircraft system to be described describes the method in association with the cabin air compressor, it should be understood that the method could be used in predicting a future needed repair and/or maintenance activity for other systems of an aircraft. As represented in FIG. 1, an environmental control system (ECS) 10 of the aircraft controls the operation of a cabin air compressor 12. The cabin air compressor 12 supplies pressurized air to the air conditioning pack (pressurization and air conditioning kit) 14 and the trim air system 16 in the aircraft. Together the air conditioning pack 14 and the trim air system 16 maintain a desirable cabin air temperature and cabin pressurization for the passengers in the aircraft cabin and the aircraft crew in the aircraft cabin and flight deck 18.

Figure 2:
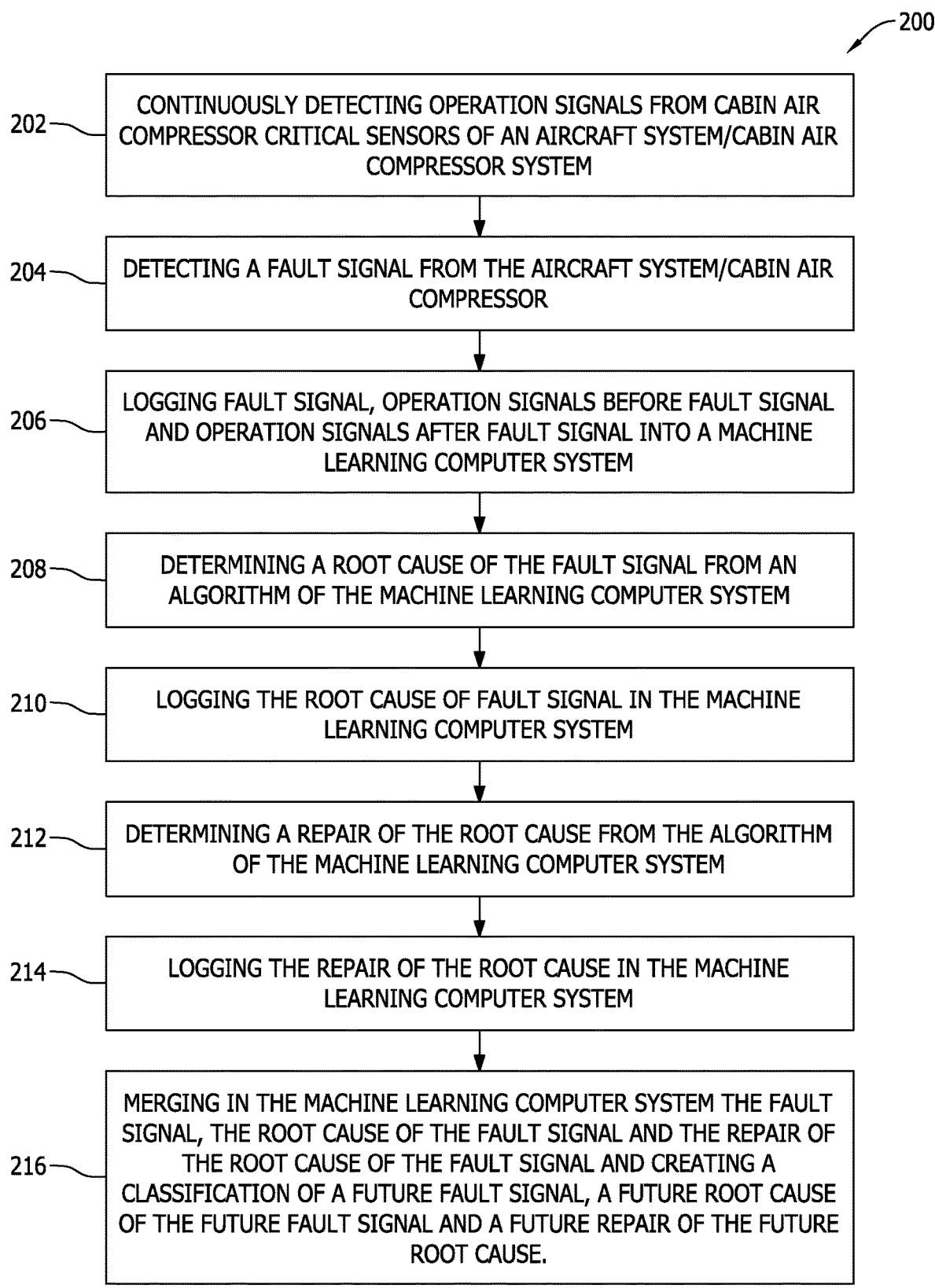
FIG. 2 is a schematic representation of a flow chart of the method of predicting a needed repair and/or maintenance activity for an aircraft system of this disclosure.

A plurality of sensors 22 sense and monitor operation signals 24 or operating parameters of the cabin air compressor 12. Some examples of operation signals 24 sensed by the plurality of sensors 22 could include operation signals 24 indicative of air pressure levels of the cabin air compressor 12, air flow rates of the cabin air compressor 12, and air temperature of the cabin air compressor 12. The plurality of sensors are cabin air compressor 12 related critical sensors 22. The plurality of sensors 22 continuously detect operation signals 24 from the cabin air compressor 12. In the method flow chart 200 of FIG. 2, this is represented by method step 202 of FIG. 2. In this disclosure, the plurality of sensors 22 are continuous parameters log in sensors that continuously detect operation signals 24 and log the operation signals 24 to a computer system 26 on the aircraft.

The computer system 26 is a machine learning computer system that is programmed with learning algorithms and statistical models that the computer system 26 uses to perform (e.g. to execute) the methods of this disclosure. The machine learning algorithms of the computer system 26 build a mathematical model of raw data or operation signals 24 logged into the computer system 26 to predict a future fault of the cabin air compressor 12 and a future needed repair and/or maintenance activity for the cabin air compressor 12 based on the raw data or operation signals 24 logged into the computer system 26.

When a fault in the operation of the cabin air compressor 12 is sensed by any one of the plurality of the sensors 22, a fault signal from the cabin air compressor 12 is detected. This is represented by method step 204 of FIG. 2. The fault signal is sent by the sensor to the environmental control system 10 of the aircraft where the signal is displayed to the crew, and to the computer system 26. The fault signal is indicative of a fault detected in the operation of the cabin air compressor 12, and the time that the fault has been detected. This is represented by method step 204 of FIG. 2. The fault signal is logged into the computer system 26. Additionally, operation signals 24 representative of operating conditions of the cabin air compressor 12 sensed by the plurality of sensors 22 at the time of the fault signal, for a period of time before the generation of the fault signal and for a period of time after the generation of the fault signal are also logged into the computer system 26. In the computer system 26, the operation signals 24 of the cabin air compressor 12 sensed by the plurality of sensors 22 at the time of the fault signal, for a period of time before the fault signal and for a period of time after the fault signal are logged into the computer system 26 and are associated with or merged with the particular fault signal logged into the computer system 26. This is represented by method step 206 of FIG. 2.

After the flight during which the fault signal is generated by the cabin air compressor 12 and transmitted to the environmental control system 10, the flight crew of the aircraft will report the receipt of the fault signal by the environmental control system 10. On the occurrence of an initial fault signal generated by the cabin air compressor 12 in the service life of the aircraft, sufficient data has not been logged into the computer system 26 to enable the computer system to identify the root cause of the fault signal, and to identify the required maintenance/repair to overcome the root cause of the fault signal. The initial data logged into the computer system 26 regarding the initial fault signal is logged into the computer system 26 by a technician. On occurrence of the initial fault signal in the service life of the aircraft, the technician determines the root cause of the fault signal and logs the root cause into the computer system 26. The technician also determines the needed maintenance/repair of the cabin air compressor 12 to overcome the root cause of the fault signal and logs the needed maintenance/repair into the computer system 26. It may be necessary for the technician to log this initial information into the computer system 26 more than once. For example, if three different fault signals are generated by the cabin air compressor 12 and transmitted to the environmental control system 10, with each of the three different fault signals having a different root cause and a different maintenance/repair required to overcome each root cause, it would be necessary for the technician to examine the cabin air compressor 12 after each of the three different fault signals and determine the three different root causes of the three different fault signals. The technician would then also determine the three different maintenance/repairs needed to the cabin air compressor 12 to overcome the three different fault signals. In this way, historical data is initially logged into the computer system 26 to enable the computer system 26 to predict a future fault signal of the three initial fault signals, and identify a future root cause of each of the three initial fault signals and to identify the maintenance/repair needed to correct each of the three initial root causes.

With historical data having been logged into the computer system 26, subsequent fault signals are analyzed by the computer system 26. The computer system 26, from the operation signals 24 received by the plurality of sensors 22, makes a determination of what was the root cause of the fault signal generated by the cabin air compressor 12. This is represented by method step 208 of FIG. 2 The machine learning computer system 26 also determines what part of the cabin air compressor 12 is defective or in need of repair, and thus the root cause of the fault signal generated by the cabin air compressor 12. In the computer system 26, the root cause of the fault signal is associated with or merged with the particular fault signal generated by the cabin air compressor 12 and the operation signals 24 of the cabin air compressor 12 sensed by the plurality of sensors 22 at the time of the fault signal generated, for a period of time before the generation of the fault signal and for a period of time after the generation of the fault signal. For example, the operation signals 24 of the cabin air compressor 12 are sensed by the plurality of sensors 22 for five minutes before the generation of the fault signal and for five minutes after the generation of the fault signal. The fault signal is extracted, pre-processed, treated for missing values, is aggregated and finally analyzed and fed into a machine learning algorithm in the computer system 26 that is specific to a fault associated with a maintenance message code. For example, diagnostic models are built into the machine learning computer system 26 for the top three message codes separately, to identify the anomalies associated with the top three message codes. In the machine learning computer system 26 the information from the sensors 22 is merged with past historical data to determine any anomaly in any sensor reading. Basic interpretable diagnostic rules are then generated from the algorithm of the machine learning computer system 26 (for example, a random forest type algorithm, or a decision tree type algorithm) linking each sensor signature or fault signal with a root cause. The anomaly/fault signal of a specific sensor 22 then helps determine the root cause for the fault. The fault signal, the root cause of the fault signal and the operation signals 24 of the cabin air compressor 12 are all associated or merged together in the computer system 26. This is represented by method step 210 of FIG. 2.

A determination is then made by the machine learning computer system 26, based on the root cause of the fault signal determined by the computer system, of the repair and/or maintenance needed to the cabin air compressor 12 to correct the root cause of the fault in the cabin air compressor 12 that generated the fault signal. This is represented by method step 212 of FIG. 2. Historical maintenance records for previously occurring fault signals provide detailed information on the repair/maintenance activity performed for each previously occurring fault signal received or logged into the computer system 26 (for example, the top three maintenance message codes). The previously occurring repair/maintenance activity information is logged into the algorithm of the machine learning computer system 26 and is used to determine the best maintenance action needed for a given root cause of a fault signal. When the needed repair and/or maintenance of the cabin air compressor 12 is completed, the needed repair and/or maintenance activity is logged into the computer system 26. This is represented by method step 214 of FIG. 2. In the computer system 26 the needed repair and/or maintenance activity for the cabin air compressor 12 is associated or merged with the particular fault signal generated by the cabin air compressor 12 and logged into the computer system 26, the root cause of the fault signal logged into the computer system 26, and the plurality of operation signals 24 or parameters of the cabin air compressor 12 sensed by the plurality of sensors 22 at the time of the fault signal and logged into the computer system 26, for a period of time before the fault signal that has been logged into the computer system 26 and for a period of time after the fault signal that has been logged into the computer system 26.

In the computer system 26, the operation signals 24 or operating parameters of the cabin air compressor 12 sensed by the plurality of sensors 22 at the time of the fault signal generated by the cabin air compressor 12, for a period of time (for example, five minutes) before the fault signal and for a period of time (for example, five minutes) after the fault signal that have been logged into the computer system 26, the fault signal generated by the cabin air compressor 12 that has been logged into the computer system 26, the root cause of the fault signal that has been logged into the computer system 26, and the repair of the root cause of the fault signal that has been logged into the computer system 26 are associated and merged together in creating a classification system of future fault signals, future operation signals 24 generated by the plurality of sensors 22 around the future fault signal, future root causes of the future fault signals and the future repairs needed and/or maintenance needed for the future root cause of the future fault signal. This is represented by method step 216 of FIG. 2.

In subsequent flights, the operation signals 24 or operating parameters of the cabin air compressor 12 sensed by the plurality of sensors 22 at the time of a fault signal during the subsequent flight, for the period of time before the fault signal and the period of time after the fault signal are logged into the computer system 26. The fault signal generated by the cabin air compressor 12 during the subsequent flight is logged into the computer system 26. The root cause of the fault signal during the subsequent flight is logged into the computer system 26. The repair of the root cause of the fault signal is logged into the computer system 26. This collection of data into the computer system 26 is continued on subsequent flights. In the computer system 26, the data logged into the computer system 26 from the subsequent flights is continuously merged and creates a classification system that enables predicting a future fault signal, a future root cause of the future fault signal, and a future needed repair and/or maintenance activity for the cabin air compressor 12 from the plurality of sensors 22 that continuously sense and monitor the operation signals 24 or parameters of the cabin air compressor 12.

Figure 3:
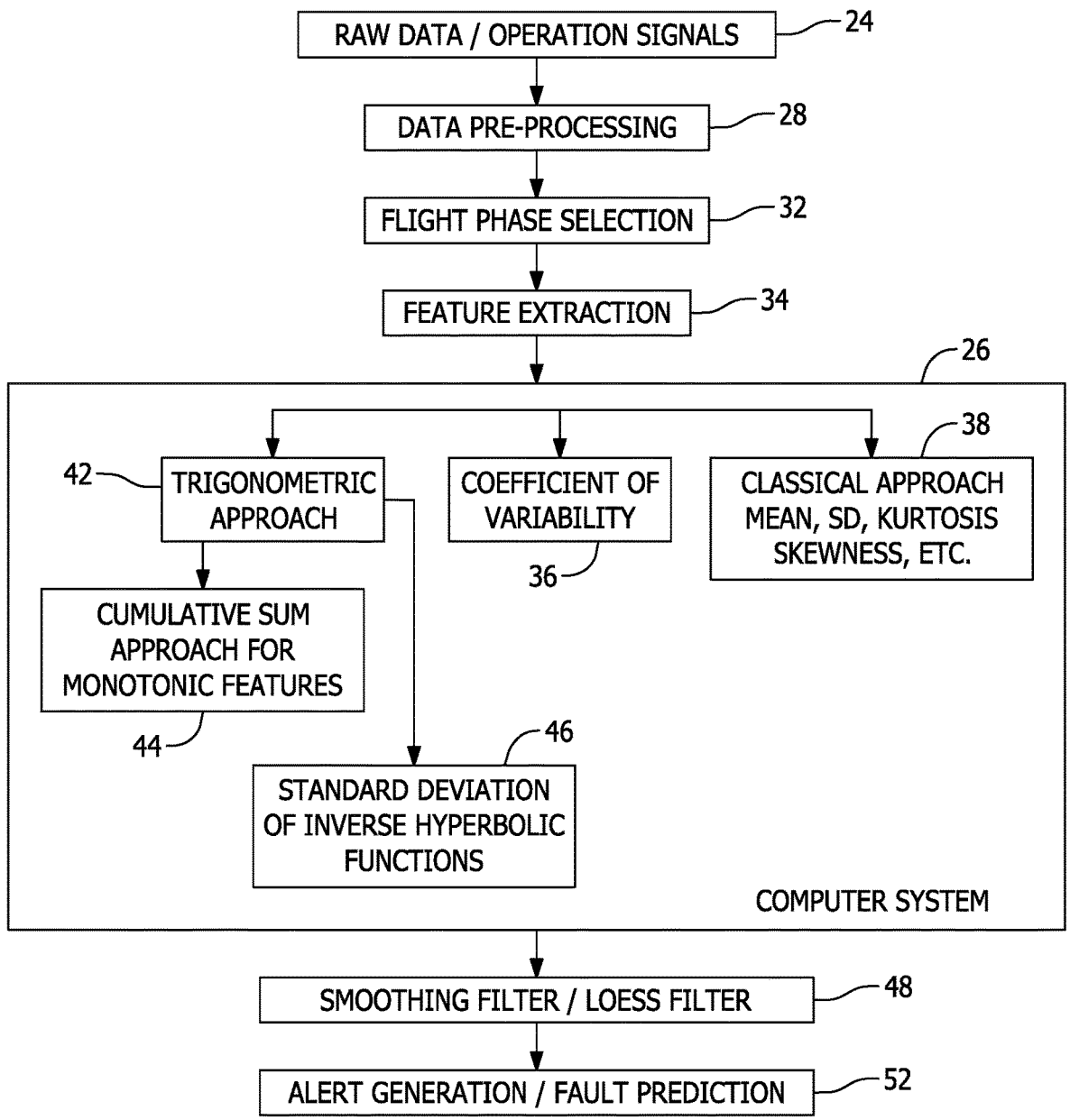
FIG. 3 is a schematic representation of a method performed by a machine learning computer system of this disclosure to transform raw data input into the computer system to a future fault prediction of a cabin air compressor.

FIG. 3 is a schematic representation of the method performed by the machine learning computer system 26 of this disclosure to transfer raw data or operation signals 24 input into the computer system 26 into a future fault prediction of the cabin air compressor 12. In FIG. 3, raw data (e.g. raw sensor data, time series sensor data) of the operation signals 24 is input into the computer system 26. The raw data could include a fusion of the operation signals 24, the sensor data input by the plurality of sensors 22, information input into the computer system 26 by the cabin air compressor 12, maintenance data on the cabin air compressor 12, and part repair data for the cabin air compressor 12.

The raw data or operation signals 24 are pre-processed 28. In pre-processing of the data 28 the operation signals 24 having missing values are removed, for example values that were not sensed by the air compressor related critical sensors 22. In replacing a missing value or a missing operation signal 24 in a series of operation signals 24, a last observed operation signal 24 could be carried forward to serve as the missing value or missing operation signal 24.

In a flight of an aircraft there are several flight phases the aircraft passes through. The data pre-processing 28 is done across each flight phase of aircraft operation, for example across a climbing flight phase of aircraft operation, a cruising flight phase of operation and a descent flight phase of aircraft operation, etc. These are only a few examples of different flight phases. A typical flight will include many more flight phases. Fault signals could occur in each of the flight phases. In flight phase selection 32, the flight phases in which a large number of fault signals occur are selected. It is only after the raw data or operation signals 24 are pre-processed and cleaned before the data is further analyzed.

The operation signals 24 then go through feature extraction 34. The operation signals 24 from the air compressor related critical sensors 22 are windowed or organized across the selected flight phases 32. The operation signals 24 are captured per second, and the operation signals 24 are aggregated across the flight phases 32 by application of statistical or complex mathematical functions.

One operation signal 24 aggregation technique involves determining a coefficient of variability 36 from the operation signals 24. The coefficient of variability 34 is a known mathematical function or algorithm that shows the extent of variability in relation to the mean of the operation signals 24. The operation signals 24 from the air compressor related critical sensors 22 in this operation signals 24 aggregation technique determine a ratio of the standard deviation (variability) to the mean of the operation signals 24 and generates new features for analysis.

A further operation signals 24 aggregation technique involves a classical approach using mean, standard deviation (SD), Kurtosis, skewness, and other related known mathematic functions and algorithms, represented in FIG. 3 by aggregation technique 38. This aggregation technique 38 applies basic statistical functions on the operation signals 24 to process and express the operation signals 24 in summary form.

A still further operation signals 24 aggregation technique involves a trigonometric approach 42 or trigonometric technique. The trigonometric approach 42 is a known mathematic function or algorithm to extract meaningful information from the operation signals 24. This operation signals 24 aggregation technique approach 42 basically applies trigonometric functions (sine, tangent, cosine) to transform the operation signals 24 and hence create or generate new features that are allocated at each flight phase level of aircraft operation.

The cumulative sum approach for monotonic features 44 is applied to the operation signals 24 for monitoring change detection in the operation signals 24. The cumulative sum approach 44 is a known mathematic function or algorithm that is used for monitoring change detection in statistical quality control of the operation signals 24. The cumulative sum approach for monotonic features 44 is an operation signals 24 aggregation technique that is applied to the operation signals 24 that are monotonic in a continuously increasing sequence or a continuously decreasing sequence to monitor for change detection.

The standard deviation of inverse hyperbolic functions 46 is a known mathematic function or algorithm that is applied to the operation signals 24 in aggregating the operation signals 24 and generating the final operation signals 24 to be used by the computer system 26 in predicting a fault signal.

The meaningful information or focused information of the operation signals 24 that have gone through the coefficient of variability 36 aggregation technique, the classical approach using mean, standard deviation (SD) Kurtosis, skewness aggregation technique 38, the trigonometric approach 42 aggregation technique, the cumulative sum approach for monotonic features 44 aggregation technique and the standard deviation of inverse hyperbolic functions 46 aggregation technique is then passed through a smoothing filter, for example a loess filter 48. The smoothing filter or loess filter 48 filters out noise from the focused operation signals 24 creating a clean aggregation of operation signals 24.

The operation signals 24 passed through the smoothing filter or loess filter 48 is used in the computer system 26 for alert generation and fault prediction 52, generating or raising an alert of a predicted fault (e.g. a predicted fault signal) of the cabin air compressor 12 in the future, for example, as much as two days before a potential fault may occur.

The compilation of operating signals 24 or operating parameters of the cabin air compressor 12 sensed by the plurality of sensors 22 at the time of the fault signal during the subsequent flight, for the period of time before the fault signal and the period of time after the fault signal that have been logged into the computer system 26 can be observed at the environmental control system 10 and used to predict a needed future repair and/or maintenance activity for the cabin air compressor 12. The operation signals 24 or operating parameters of the cabin air compressor 12 sensed by the plurality of sensors 22 during a current flight are compared to previously logged operation signals 24 or operating parameters of the cabin air compressor 12 to predict a future fault signal, the root cause of the future fault signal and the repair of the root cause. In this way, future needed repairs and/or maintenance activity for the cabin air compressor 12 are predicted.

As various modifications could be made in the method of predicting a repair and maintenance activity for an aircraft system herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. A method of predicting a repair and maintenance activity for an aircraft system, the method comprising:
   providing a computer system, programmed with learning algorithms, in communication with an aircraft system,
   providing a plurality of sensors in communication with the computer system, wherein the plurality of sensors includes continuous parameter login sensors;
   detecting a fault signal from the aircraft system, when a fault is sensed by one of the plurality of sensors of the aircraft system, the fault signal being indicative of the fault in the aircraft system;
   logging the fault signal into the computer system, wherein a root cause of the fault signal is determined;

logging the root cause of the fault signal into the computer system, wherein a repair of the root cause of the fault signal is determined;

logging the repair of the root cause of the fault signal into the computer system; and merging, in the computer system, the fault signal, the root cause of the fault signal and the repair of the root cause of the fault signal, wherein the computer system creates a classification system of future fault signals, future root causes of the future fault signals and future repairs of the future root causes.

2. The method of claim 1, wherein the aircraft system is a cabin air compressor system.

3. The method of claim 2, wherein the computer system is a machine learning computer system.

4. The method of claim 3, including:

continuously detecting operation signals from the aircraft system;

logging the operation signals at a time of the fault signal into the computer system; and wherein merging, in the computer system, includes merging the operation signals, and wherein creating the classification system includes future operations signals generated by the plurality of sensors around the future fault signals.

5. The method of claim 4, including:

logging the operation signals into the computer system for a period of time before the fault signal is detected and logging the operation signals into the computer system for a period of time after the fault signal is detected.

6. The method of claim 3, wherein the fault signal is from a cabin air compressor critical sensor.

7. The method of claim 6, wherein the cabin air compressor critical sensor monitors operation of the cabin air compressor system and provides operation signals to the machine learning computer system;

the operation signals provided to the machine learning computer system are aggregated by the machine learning computer system; and the operation signals aggregated by the machine learning computer system are used by the machine learning computer system in alert generation and fault prediction.

8. The method of claim 7, wherein the machine learning computer system is operable in alert generation and fault prediction as much as 48 hours before the future fault signal occurs.

9. A computer system for executing a method of predicting repair and maintenance activity for an aircraft system, the method comprising:

providing a computer system, programmed with learning algorithms, in communication with the aircraft system, providing a plurality of sensors in communication with the computer system, wherein the plurality of sensors includes continuous parameter login sensors;

logging operation signals from at least one of the plurality of sensors of the aircraft system into the computer system;

logging a fault signal from the at least one of the plurality of sensors of the aircraft system into the computer system, when a fault is sensed by the at least one of the plurality of sensors of the aircraft system;

logging a root cause of the fault signal into the computer system;

logging a repair and/or maintenance activity to correct the root cause of the fault signal into the computer system; and merging, in the computer system, the operation signals, the fault signal, the root cause of the fault signal and the repair and/or maintenance activity logged into the computer system, wherein the computer system creates a classification system of future fault signals, future root causes of the future fault signals and future repair and/or maintenance activities to correct the future root causes of the future fault signals.

10. The computer system of claim 9, wherein the aircraft system is a cabin air compressor system.

11. The computer system of claim 10, wherein the computer system is a machine learning computer system.

12. The computer system of claim 11, the method including:

continuously detecting the operation signals from the at least one of the plurality of sensors of the aircraft system; and logging the operation signals from the at least one of the plurality of sensors at a time of the fault signal into the computer system.

13. The computer system of claim 12, the method including:

logging the operation signals from the at least one of the plurality of sensors of the aircraft system for a period of time before the fault signal and logging the operation signals from the at least one of the plurality of sensors of the aircraft system for a period of time after the fault signal.

14. The computer system of claim 11, wherein the at least one of the plurality of sensors of the aircraft system is a cabin air compressor critical sensor.

15. The computer system of claim 14, wherein the cabin air compressor critical sensor monitors operation of the cabin air compressor system and provides operation signals to the machine learning computer system, the operation signals provided to the machine learning computer system are aggregated by the machine learning computer system, and the operation signals aggregated by the machine learning computer system are used by the machine learning computer system for alert generation and fault prediction.

16. The computer system of claim 15, wherein the machine learning computer system is operable for alert generation and fault prediction as much as 48 hours before the future fault signal occurs.

17. A method of predicting repair and maintenance activity for an aircraft system, the method comprising:

providing a computer system, programmed with learning algorithms, in communication with an aircraft system, providing a plurality of sensors in communication with the computer system, wherein the plurality of sensors includes continuous parameter login sensors;

using at least one of the plurality of sensors to monitor operation of the aircraft system and outputting operation signals from the at least one of the plurality of sensors that are indicative of the operation of the aircraft system;

logging the operation signals in a computer system;

detecting a fault signal from the at least one of the plurality of sensors that is indicative of a fault in the aircraft system on occurrence of the fault in the aircraft system;

logging the fault signal in the computer system;

determining a root cause of the fault signal from the at least one of the plurality of sensors;

logging the root cause of the fault signal from the at least one of the plurality of sensors into the computer system;

determining a repair and maintenance activity to conduct on the aircraft system to correct the root cause of the fault signal from the at least one of the plurality of sensors;

logging the repair and maintenance activity into the computer system; and merging, in the computer system, the operation signals, the fault signal, the root cause of the fault signal, and the repair and/or maintenance activity logged into the computer system, wherein the computer system creates a classification system of future fault signals, future root causes of the future fault signals and future repair and/or maintenance activity activities needed to correct the future fault signals in response to the future fault signals being logged into the computer system.

18. The method of claim 17, wherein the computer system is a machine learning computer system.

19. The method of claim 18, wherein the aircraft system is a cabin air compressor system.

20. The method of claim 19, wherein the at least one of the plurality of sensors of the aircraft system is a cabin air compressor related critical sensor.

\* \* \* \* \*